United States Patent
Stiles et al.

(10) Patent No.: US 8,539,648 B2
(45) Date of Patent: Sep. 24, 2013

(54) QUICK DETACH SHACKLE

(75) Inventors: Mark A. Stiles, Atlanta, GA (US); Anna Marie Frey, Atlanta, GA (US); Steve Drabant, Lawrenceville, GA (US)

(73) Assignee: Simpson Performance Products, Inc., New Braunfels, TX (US)

( * ) Notice: Subject to any disclaimer, the term of this patent is extended or adjusted under 35 U.S.C. 154(b) by 581 days.

(21) Appl. No.: 12/775,926

(22) Filed: May 7, 2010

(65) Prior Publication Data

US 2010/0269310 A1    Oct. 28, 2010

Related U.S. Application Data

(63) Continuation-in-part of application No. 12/348,739, filed on Jan. 5, 2009, now abandoned.

(60) Provisional application No. 61/010,087, filed on Jan. 4, 2008.

(51) Int. Cl.
  *A44B 11/00* (2006.01)
  *A44B 11/25* (2006.01)

(52) U.S. Cl.
  USPC .......... 24/351; 24/265 EC; 24/358; 24/595.1; 294/82.34

(58) Field of Classification Search
  USPC .............. 2/421; 24/351, 595.1, 265 EC, 166, 24/356–358, 360, 363, 371, 334, 305, 316, 24/326, 265 H, 163 R; 70/2; 294/82.33, 294/82.34
  See application file for complete search history.

(56) References Cited

U.S. PATENT DOCUMENTS

| 967,141 | A |   | 8/1910 | Merriman |
|---|---|---|---|---|
| 3,341,907 | A | * | 9/1967 | Michael .................. 24/599.1 |
| 3,850,468 | A |   | 11/1974 | Hultin |
| 3,911,671 | A | * | 10/1975 | Guillen ........................ 59/89 |
| 3,930,290 | A |   | 1/1976 | Mangels |
| 4,093,293 | A |   | 6/1978 | Huggett |
| 4,094,047 | A |   | 6/1978 | Carlsson |
| 4,279,062 | A |   | 7/1981 | Boissonnet |
| 4,401,333 | A | * | 8/1983 | Merry .................... 294/82.34 |
| D274,038 | S | * | 5/1984 | Merry ........................ D8/382 |
| 4,514,883 | A | * | 5/1985 | Barbieri et al. ........... 24/163 K |

(Continued)

FOREIGN PATENT DOCUMENTS

| EP | 0087289 | 8/1983 |
|---|---|---|
| WO | WO2009089175 | 7/2009 |

OTHER PUBLICATIONS

PCT/US2009/030142, Jan. 5, 2009, Hans Performance Products, Written Opinion, Aug. 3, 2009.

(Continued)

*Primary Examiner* — Robert J Sandy
*Assistant Examiner* — Tyler Johnson
(74) *Attorney, Agent, or Firm* — Ballard Spahr LLP

(57) ABSTRACT

A shackle is provided that is fixedly mounted to a surface. The shackle can have a body, a hasp, and a locking pin. The body can define at least one mounting bore that is configured for mounting the shackle to the surface. The proximal end of the hasp is configured to rotate relative to the body and the distal end of the hasp is configured to selectively engage the locking pin, such that an enclosed area is defined. A tethering device can be attached to the shackle via cooperative engagement with the selectively enclosed area.

17 Claims, 22 Drawing Sheets

(56) References Cited

U.S. PATENT DOCUMENTS

| | | | |
|---|---|---|---|
| 4,590,882 A | | 5/1986 | Murphy |
| 4,766,616 A | | 8/1988 | Donahue |
| 5,634,246 A | * | 6/1997 | Jermyn, Jr. .................. 24/601.5 |
| 5,975,786 A | | 11/1999 | Chang |
| 6,237,977 B1 | * | 5/2001 | Johnson, Jr. ............... 294/82.34 |
| D465,405 S | * | 11/2002 | Becquevort .................. D8/367 |
| 6,539,885 B2 | | 4/2003 | Tylaska |
| 6,547,474 B1 | | 4/2003 | Smetz |
| D525,346 S | | 7/2006 | Kulig |
| 7,174,859 B2 | * | 2/2007 | Lee ............................. 119/863 |
| 2009/0183533 A1 | * | 7/2009 | Stiles ............................... 70/2 |
| 2010/0269310 A1 | * | 10/2010 | Stiles et al. ..................... 24/351 |

OTHER PUBLICATIONS

PCT/US2009/030142, Jan. 5, 2009, Hans Performance Products, International Search Report, Aug. 3, 2009.

PCT/US2009/030142, Jan. 5, 2009, Hans Performance Products, International Preliminary Report on Patentability, Jul. 6, 2010.

* cited by examiner

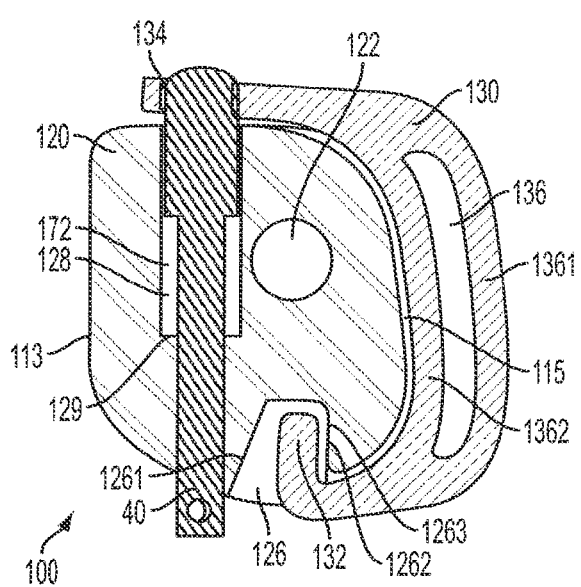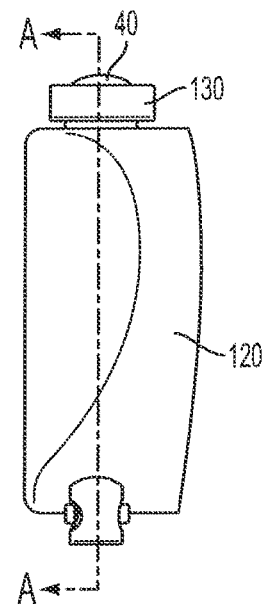
FIG. 15A    FIG. 15B
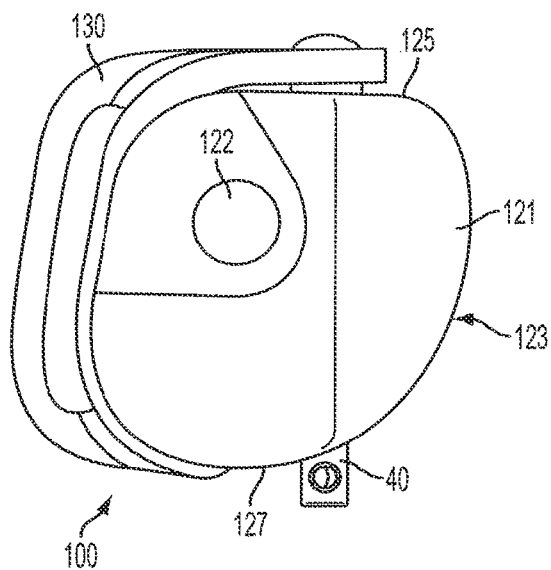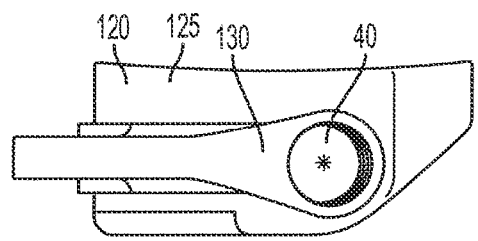
FIG. 15C    FIG. 15D

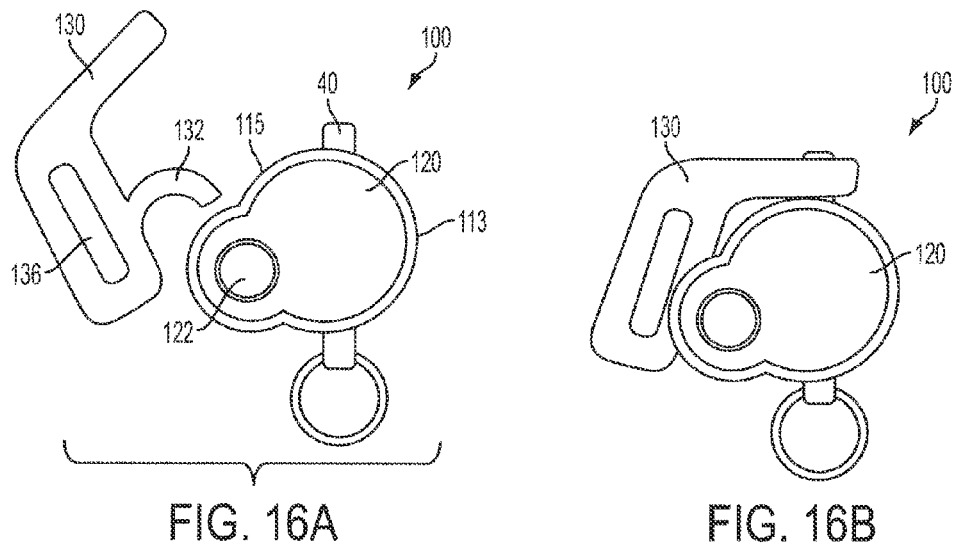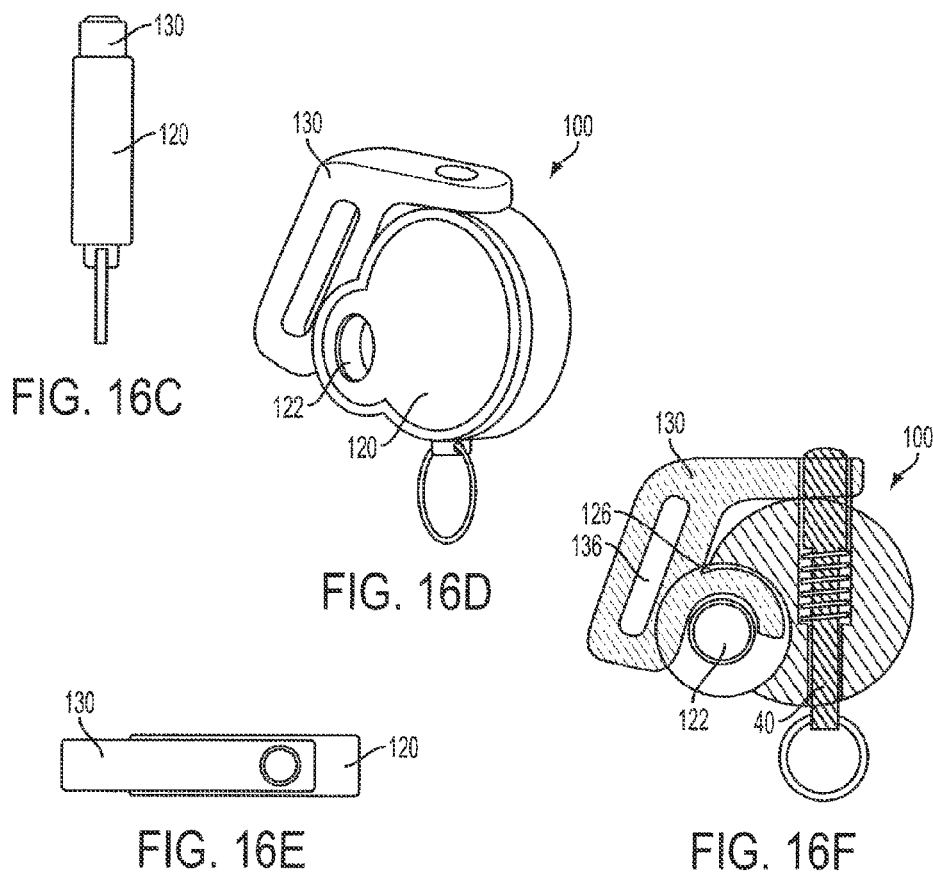

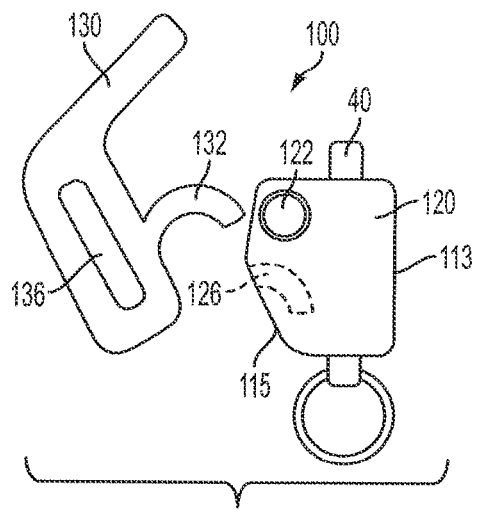
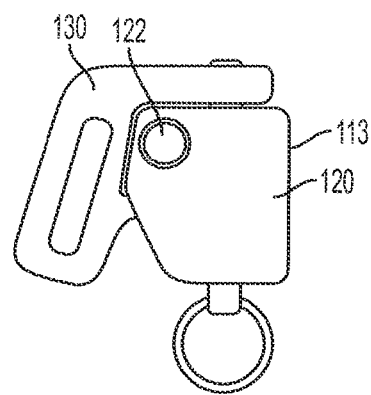
FIG. 17A  FIG. 17B
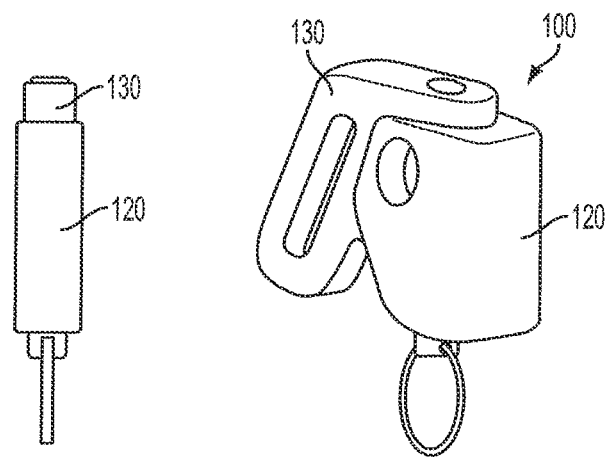
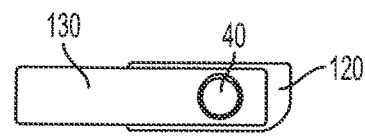
FIG. 17C  FIG. 17D  FIG. 17E

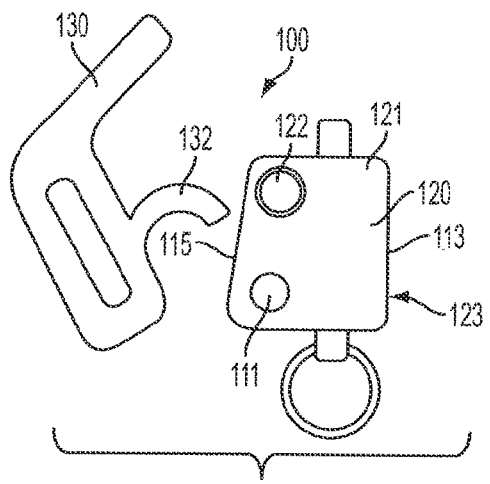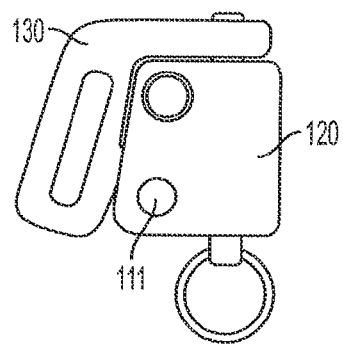
FIG. 18A    FIG. 18B
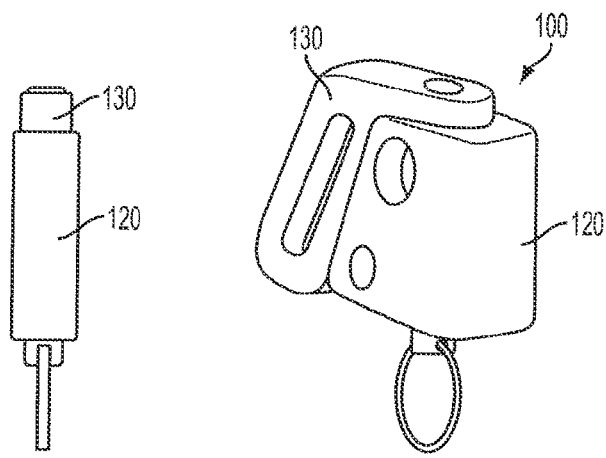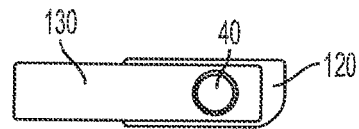
FIG. 18C    FIG. 18D    FIG. 18E

QUICK DETACH SHACKLE

CROSS REFERENCE TO RELATED APPLICATIONS

This application is a continuation-in-part of, and claims priority to and the benefit of U.S. application Ser. No. 12/348,739, filed on Jan. 5, 2009, which claims priority to and the benefit of U.S. Provisional Application No. 61/010,087, filed on Jan. 4, 2008, both of which are incorporated in their entirety in this document by reference.

FIELD OF THE INVENTION

This invention relates generally to the field of shackles, and more specifically, a mountable shackle attached to a tethering device, wherein at least a portion of the shackle can be quickly detached from the tethering device.

BACKGROUND OF THE INVENTION

Shackles are used for making connections and disconnections between tethering devices, such as ropes and cables. Shackles have been in use for many years and are commonly used in sailing. Generally, the bodies of most shackles contain an integrally formed opening for connection to a control line. They also have a hasp which is pivotally connected to the other end of the body. The free end of the hasp is engageable with a release pin which holds the hasp closed, so that a second line may be connected to the shackle body in an easily releasable manner.

Representative patents include, for example, U.S. Pat. Nos. 3,930,290 and 3,850,468, which teach a quick-release shackle. Additionally, U.S. Pat. No. 6,539,885 discloses a locking shackle apparatus. Each of these patents, however, discloses "floating" type shackles that are not rigidly attached to a mounting surface, and instead simply connect multiple lines. Thus, what is needed is a mountable shackle that can be quickly and reliably detached from a line by a user.

SUMMARY OF THE INVENTION

According to various embodiments, a quick detach shackle is provided that can be composed of a body, a hasp, and a locking pin. In one embodiment, the shackle is configured to be fixedly mounted to a surface. In one embodiment, the hasp can be attached to the body with a pin that acts as a hinge so that the hasp can be selectively opened and closed. In a further embodiment, the body defines a locking pin bore that can complementarily receive at least a portion of the locking pin. Similarly, in a further aspect, the hasp defines a bore that can complementarily receive at least a portion of the locking pin. In this aspect, when the locking pin is inserted into the body pin bore and into the hasp pin bore, an enclosed area is created, in which a tethering device can be secured.

In one aspect, the body of the quick detach shackle can also define a mounting bore and a body rotation pin bore configured for receiving a rotation pin. A bolt, screw, or other similar fastener can be inserted into the mounting bore to fixedly attach the shackle to a surface such as, for example and without limitation, a protective helmet. In another aspect, the body of the shackle can comprise a mounting boss that protrudes from a surface of the shackle and is configured for receiving a restraining device. In still another aspect, the body of the shackle can comprise a locating pin that protrudes from a surface of the shackle and is configured for matingly engaging a complementary bore in the surface to fix the shackle in a desired position and/or location. In one embodiment, the mounting bore can be positioned generally between the rotation pin bore and the locking pin bore. By placing the mounting bore in this exemplary location, the overall size of the shackle can be reduced. Also, the torque applied to the bolt, screw, or other similar fastener when the shackle is in use can beneficially be reduced. In other embodiments, one or more of the mounting bore, the mounting boss, and/or the locating pin can be positioned on the body with respect to the rotation pin bore and the locking pin bore.

In another aspect, it is contemplated that the shape of the hasp, and the relative positioning of the hasp pin hinge, mounting bore and locking pin locations can be selected so that, should the mounting be loose, either deliberately by design or through error, such applied torques act to ensure the loads on the hasp can beneficially be transferred. In this aspect, torque applied to the bolt, screw, or other similar fastener when the shackle is in use can act to ensure that the loading on the hasp can beneficially be transferred to the more secure end of the hasp adjacent the hasp rotation pin.

The quick detach shackle can by mounted to a surface, such as, for example and without limitation, a protective helmet. A tethering device, such as, for example and without limitation, a strap, can be looped around the hasp while the hasp is selectively positioned in an open position. The hasp can then be selectively rotated around the rotation pin into a closed position, and the locking pin can be inserted into the body locking pin bore and the hasp locking pin bore to secure the hasp to the body. This creates an enclosed area, which prevents the tethering device from disengaging from the hasp.

In one aspect, the quick detach shackle can further comprise a bias element, such as a spring. In this aspect, at least a portion of the bias element can be inserted into the body locking pin bore to securely position the locking pin such that the hasp can be maintained in the closed position. In order to quickly detach the shackle, for example, a user of the shackle can apply force to a pull ring that can be attached to an end of the locking pin, which compresses the bias element and thereby withdraws the locking pin. When the locking pin is withdrawn, the force of the tethering device can act on the hasp to rotate the hasp toward the open position, which allows the tethering device to be separated from the hasp and the quick detach shackle.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 15A is a cross-sectional view of an embodiment of a quick detach shackle in a closed position, according to one aspect.

FIGS. 15B-C are elevational views of the quick detach shackle of FIG. 15A.

FIG. 15D is a plan view of the quick detach shackle of FIG. 15A.

FIG. 16A is an elevational view of an embodiment of a quick detach shackle in an open position, according to one aspect.

FIGS. 16B-C are elevational views of the quick detach shackle of FIG. 16A in a closed position.

FIG. 16D is a perspective view of the quick detach shackle of FIG. 16A in a closed position.

FIG. 16E is a plan view of the quick detach shackle of FIG. 16A in a closed position.

FIG. 16F is a cross-sectional view of the quick detach shackle of FIG. 16A in a closed position.

FIG. 17A is an elevational view of an embodiment of a quick detach shackle in an open position, according to one aspect.

FIGS. 17B-C are elevational views of the quick detach shackle of FIG. 17A in a closed position.

FIG. 17D is a perspective view of the quick detach shackle of FIG. 17A in a closed position.

FIG. 17E is a plan view of the quick detach shackle of FIG. 17A in a closed position.

FIG. 18A is an elevational view of an embodiment of a quick detach shackle in an open position, according to one aspect.

FIGS. 18B-C are elevational views of the quick detach shackle of FIG. 18A in a closed position.

FIG. 18D is a perspective view of the quick detach shackle of FIG. 18A in a closed position.

FIG. 18E is a plan view of the quick detach shackle of FIG. 18A in a closed position.

DETAILED DESCRIPTION OF THE INVENTION

The present invention may be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "bore" can include two or more such bores unless the context indicates otherwise.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Reference will now be made in detail to the present preferred embodiment(s) of the invention, examples of which are illustrated in the accompanying drawings. Wherever possible, the same reference numbers are used throughout the drawings to refer to the same or like parts.

Figure 1:
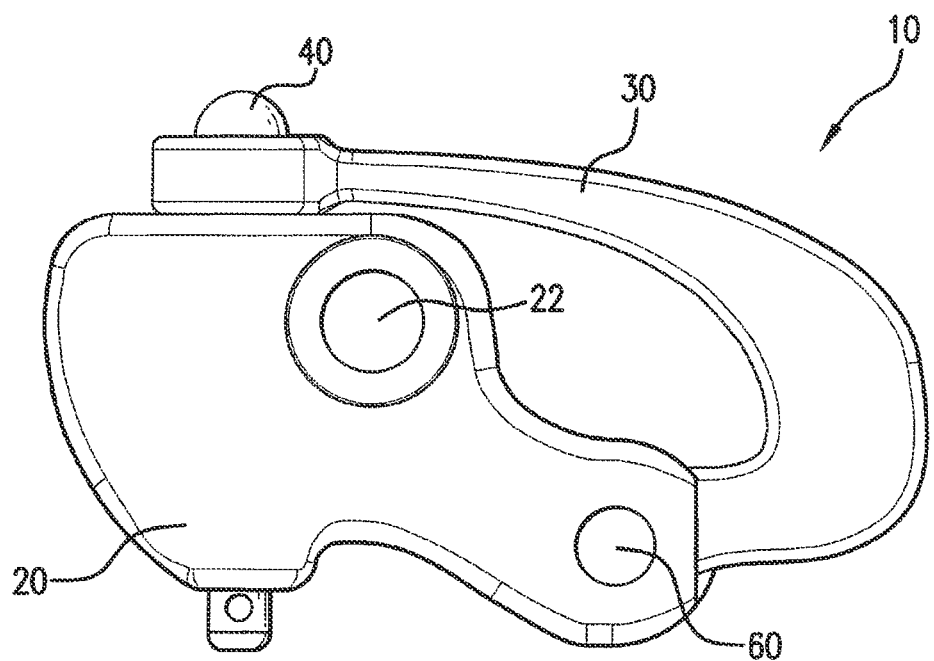
FIG. 1 is a front elevational view of a first embodiment of the quick detach shackle, showing a locking pin, a body, and a hasp.

A quick detach shackle is provided, according to various aspects. In one embodiment, as shown in FIG. 1, a quick detach shackle 10 comprises a body 20, a hasp 30, and a locking pin 40. In one aspect, the body can define at least one mounting bore 22 that is configured for attaching the shackle to a mounting surface, such as, for example and without limitation, a helmet surface. According to other aspects, the body can comprise at least one mounting boss 19 and/or at least one locating pin 17. As will be described more fully below, the at least one mounting bore, and/or the at least one mounting boss, and/or the at least one locating pin can be configured for attaching the shackle to a mounting surface. In one exemplary embodiment, the quick detach shackle can also comprise a bias element 70, such as a spring.

Figure 2:
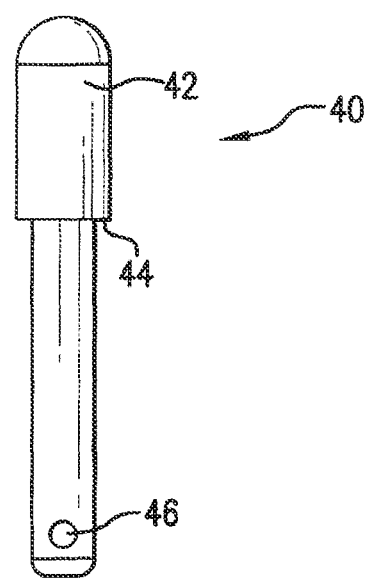
FIG. 2 is a front elevational view of the locking pin of the shackle of FIG. 1.

One embodiment of the locking pin 40 is illustrated in FIG. 2. In one exemplary aspect, the locking pin can be substantially cylindrical and have a proximal end and an opposed distal end. In another aspect, the proximal end of the locking pin can form a locking pin head 42, which can have a diameter that is larger than the diameter of the distal end of the locking pin. A locking pin shoulder 44 can be formed on the locking pin 40 at the junction of the larger diameter of the proximal end and the smaller diameter of the distal end. Further, the distal end of the locking pin can define a substantially circular pull ring bore 46 that is configured to receive a pull ring 50 or a releasing lever 51. In still another aspect, the locking pin can be configured for selective axial movement therein a body locking pin bore 28, as described more fully below.

Figure 3:
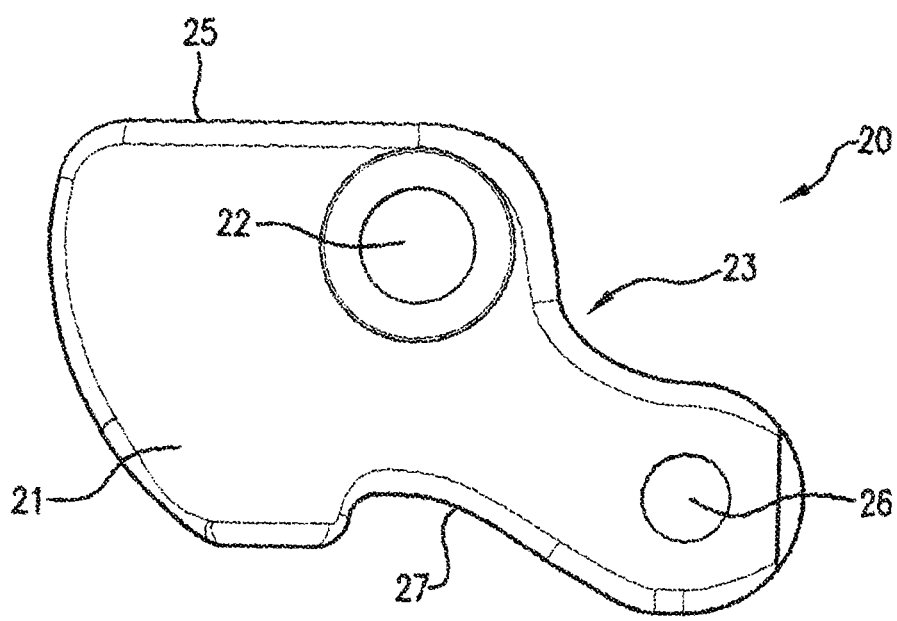
FIG. 3 is a front elevational view of the body of the shackle of FIG. 1.
Figure 5:
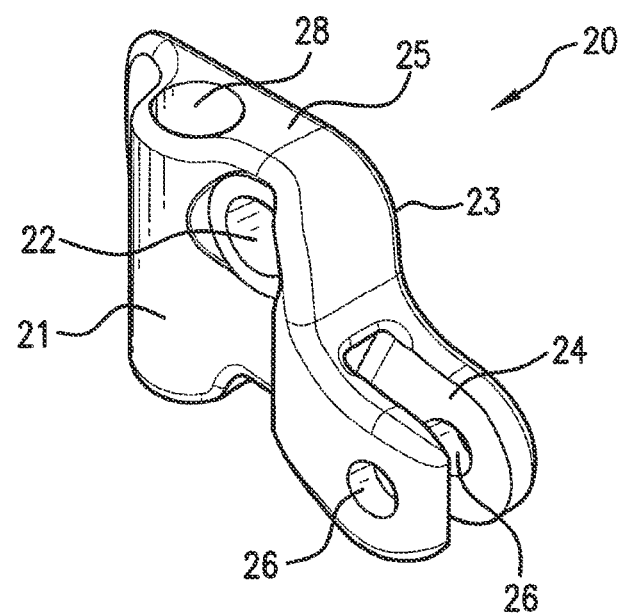
FIG. 5 is a perspective view of the body of the shackle of FIG. 3.

FIG. 3 illustrates an embodiment of the body 20 of the shackle. The body has a proximal end and a distal end, a front surface 21 and an opposing rear surface 23, an upper edge surface 25 and an opposing lower edge surface 27, and a plane bisecting the body substantially parallel to the front surface. The at least one mounting bore 22 can be a substantially circular bore of a predetermined radius that extends from the front surface of the body to the rear surface having a longitudinal axis. In one aspect, and as shown in FIG. 5, a slot 24 can be formed in the distal end of the body, which, in one example, can bifurcate the distal end of the body 20 into two portions separated by a distance. In another aspect, at least a portion of the bifurcated distal end of the body of can be configured to receive a portion of the hasp 30. Still referring to FIG. 5, the body can define a substantially circular body rotation pin bore 26 having a predetermined radius and a longitudinal axis. In one aspect, the body rotation pin bore 26 can extend from the front surface 21 of the body through the slot and to the rear surface 23 of the body. As shown in FIG. 1, the body rotation pin bore can be configured to receive a rotation pin 60 about which the hasp 30 can rotate.

Figure 4:
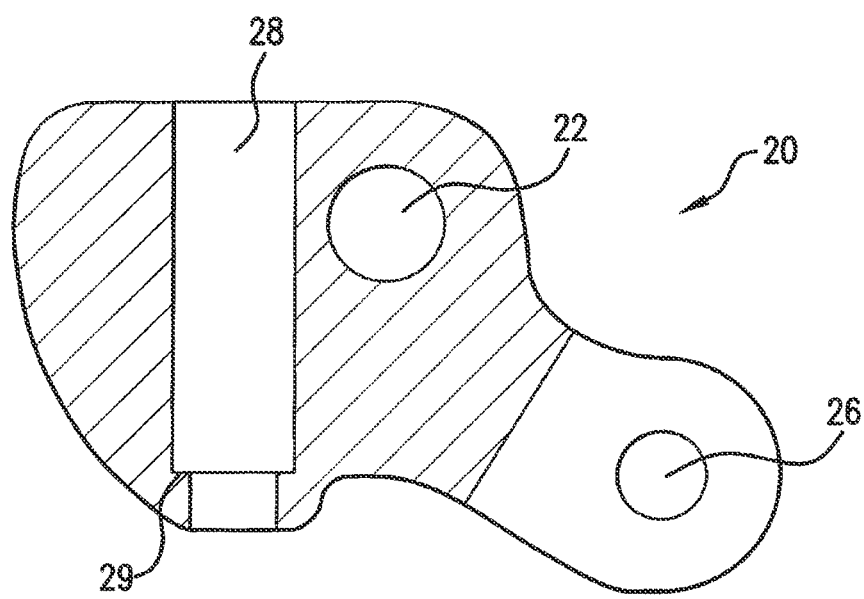
FIG. 4 is a cross-sectional view of the body of the shackle of FIG. 3.

In a further aspect, the body 20 of the shackle can define the body locking pin bore 28 having a predetermined radius. In one aspect, the body locking pin bore can define an opening in the upper edge surface 25 of the body. In another aspect, the body locking pin bore can extend from the upper edge surface of the body to the lower edge surface 27 of the body. In still another aspect, the body locking pin bore can be substantially circular. As can be seen in FIG. 4, a portion of the body locking pin bore 28 that is adjacent the upper edge surface of the body can have a predetermined radius that is greater that a portion of the body locking pin bore that is adjacent the lower edge surface, such that a shoulder 29 is formed therebetween. In one aspect, at least a portion of the body locking pin bore that is defined by the larger radius can define a spring chamber 72 that is configured for receiving the bias element 70 therein. As will be more fully described below, the shoulder creates a ledge for the bias element to seat against or engage.

Figure 13:
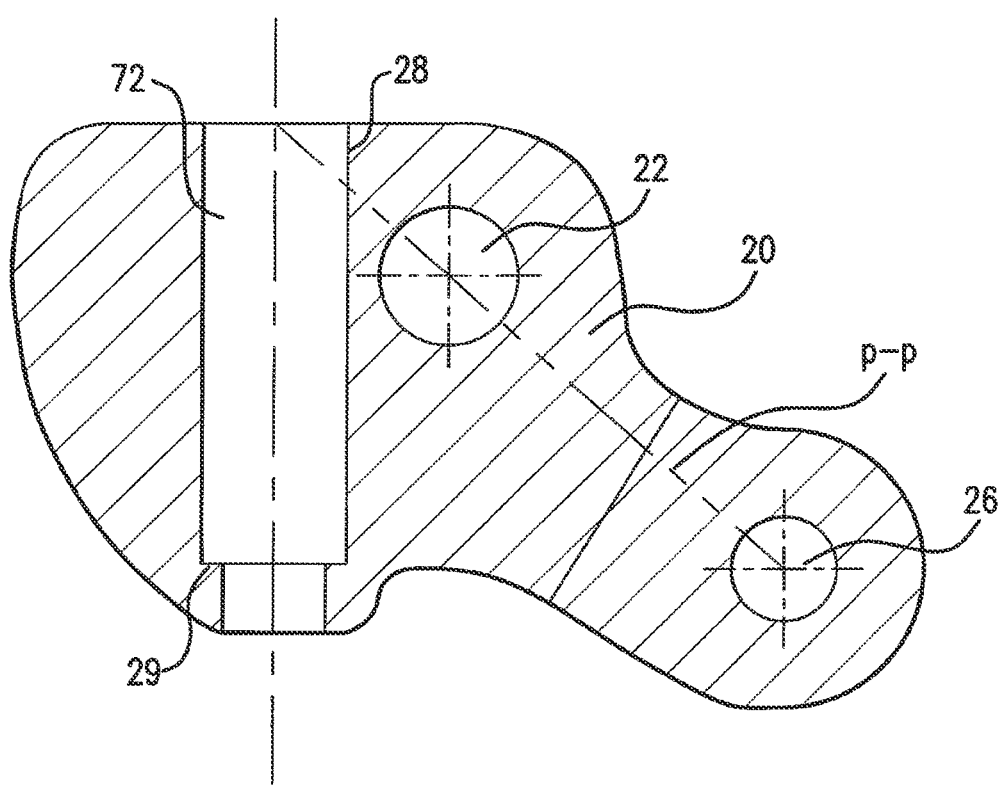
FIG. 13 is a cross-sectional view of the body of a quick detach shackle, according to one embodiment.

FIG. 13 illustrates the locations of the bores of the body 20, according to one exemplary aspect. In this aspect, and not meant to be limiting, a mounting bore of the at least one mounting bore 22 and the body rotation pin bore 26 can be defined therein the body 20 such that a plane p-p that substantially bisects the longitudinal axis of the mounting bore and the longitudinal axis of the body rotation pin bore also substantially bisects the opening in the upper edge surface 25 of the body 20. Optionally, in another aspect, a mounting bore 22 and the body rotation pin bore can be defined therein the body 20 such that the longitudinal axis of the mounting bore is spaced from a plane that substantially bisects the longitudinal axis of the body rotation pin bore 26 and the opening in the upper edge surface of the body.

Figure 19A:
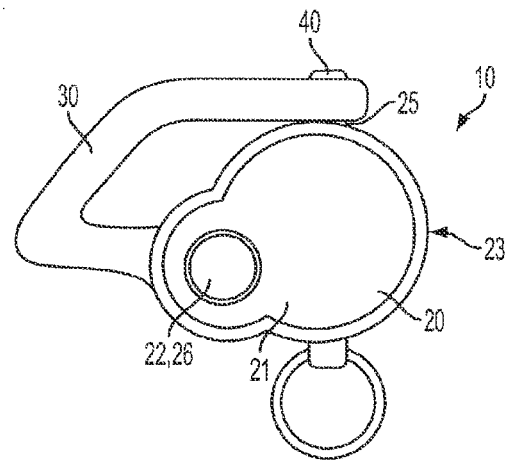
FIG. 19A-B are elevational views of an embodiment of a quick detach shackle in a closed position, according to one aspect.
Figure 19B:
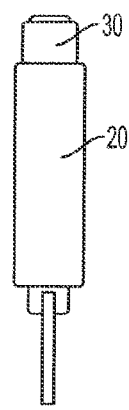
Figure 19C:
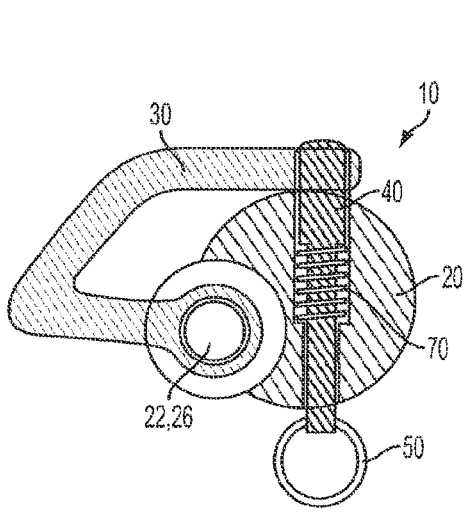
FIGS. 19C is a cross-sectional view of the quick detach shackle of FIG. 19A.
Figure 19D:
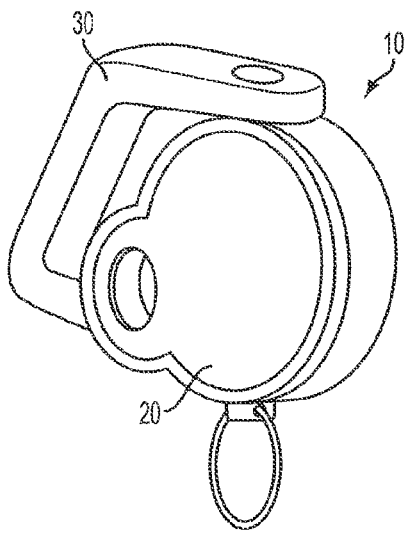
FIG. 19D is a perspective view of the quick detach shackle of FIG. 19A.
Figure 19E:
FIG. 19E is a plan view of the quick detach shackle of FIG. 19A.
Figure 20A:
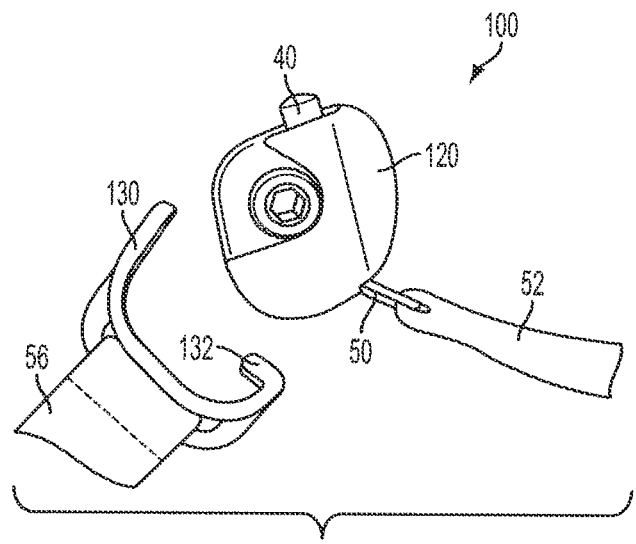
FIG. 20A is an elevational view of a quick detach shackle in an open position, according to one aspect.
Figure 20B:
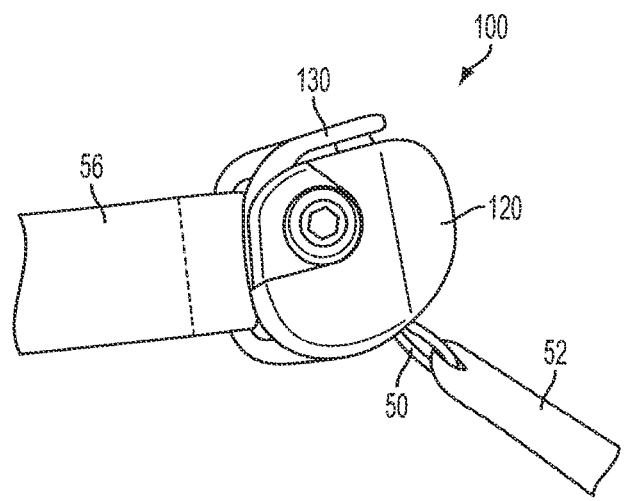
FIG. 20B is an elevational view of the shackle of FIG. 20A in a closed position.

FIGS. 19A and 19C illustrate the locations of the bores of the body 20, according to another exemplary aspect. In this aspect, the at least one mounting bore 22 and the body rotation pin bore 26 can be co-axially aligned so that the at least one mounting bore and the body rotation pin bore comprise a single bore. In this aspect, the single bore can be configured to receive a fastener, such as for example and without limitation, a bolt, screw, rivet, and the like, that can simultaneously secure the body 20 to a mounting surface 54 and provide a means for the hasp 30 to rotate about, as will be described more fully below. In one aspect, the single bore can comprise as shoulder or other stepped surface to ensure the desired ease of rotation of the hasp 30 about the single bore, without being constrained by over-torquing the mounting fastener. In another aspect, the body 20 can be very stiff such that the effects of any over-torquing of the mounting fastener do not pinch or otherwise inhibit the ease of rotation of the hasp. In still another aspect, the dual functions of the single bore can beneficially reduce the size of the shackle.

FIGS. 14A-E illustrate alternative embodiments of the body 20 showing various means for attaching the body of the shackle 10 to the mounting surface. According to the embodiments, a plurality of attachment elements are provided, such as at least one mounting bore 22, and/or at least one mounting boss 19, and/or at least one locating pin 17. A plurality of attachment elements can beneficially allow a mounted shackle to remain affixed to the mounting surface in the proper orientation more readily than would otherwise occur. Although several alternative embodiments are illustrated, it is contemplated that the body 20 can be affixed to the mounting surface by any combination of mounting bores, mounting bosses, locating pins, and/or other attachment elements, as can be appreciated by one of skill in the art.

Figure 14A:
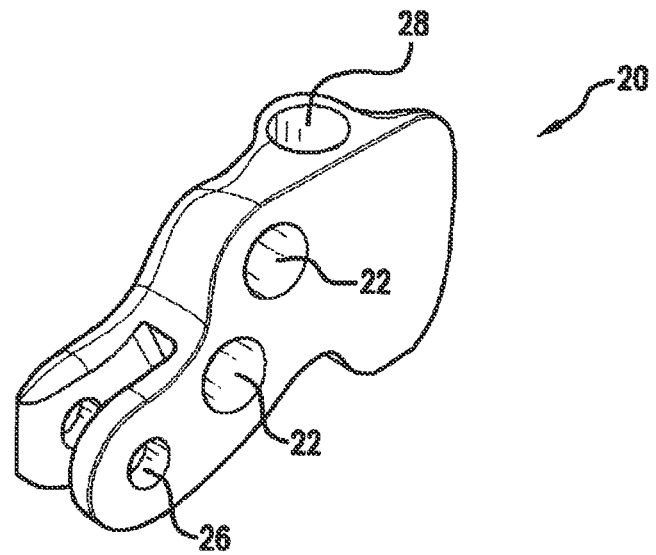
FIGS. 14A-E are perspective views of the body of a quick detach shackle, according to various embodiments.
Figure 14B:
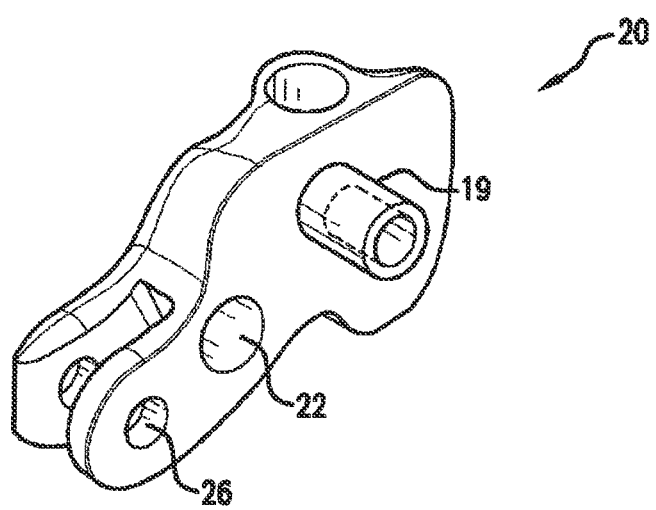

As shown in FIG. 14A, according to one embodiment, the body can define a plurality of mounting bores 22. FIG. 14B illustrates an embodiment wherein the body defines a mounting bore 22 and comprises a mounting boss 19. The mounting boss, in one aspect, can be an elongate protrusion that extends from the rear surface 23 of the body. In another aspect, the mounting boss can have a predetermined outer diameter configured to engage an inner surface of a bore defined therein the mounting surface. In still another aspect, an internal diameter of the mounting boss 19 can be threaded so that a bolt, screw, or other similar fastener can be passed through the bore of the mounting surface and engage the threads of the mounting boss, thereby securing the body 20 to the mounting surface. In a further aspect, the outer diameter of the mounting boss can be threaded so that the outer diameter of the mounting boss 19 can engage complementary threads of the bore of the mounting surface or mechanical fasteners such as nuts and the like. Because the mounting boss extends from the body 20 and does not interfere with the internal bores defined therein the body, it is contemplated that the mounting boss(es) can be beneficially positioned at any position on the rear surface of the body 20 as desired.

Figure 14C:
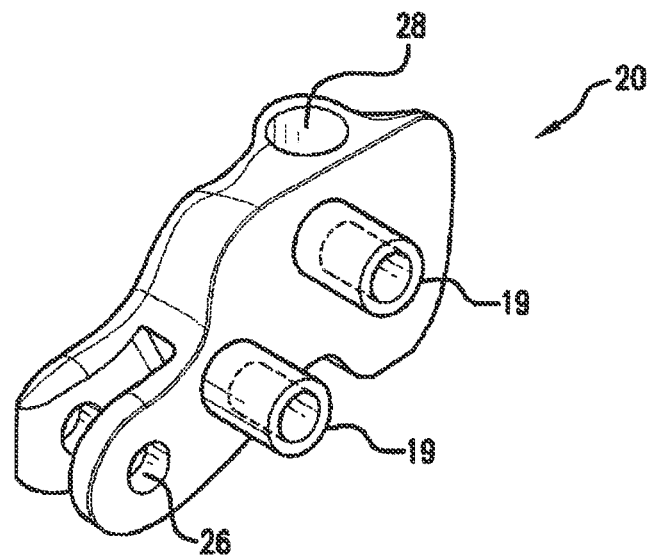
Figure 14D:
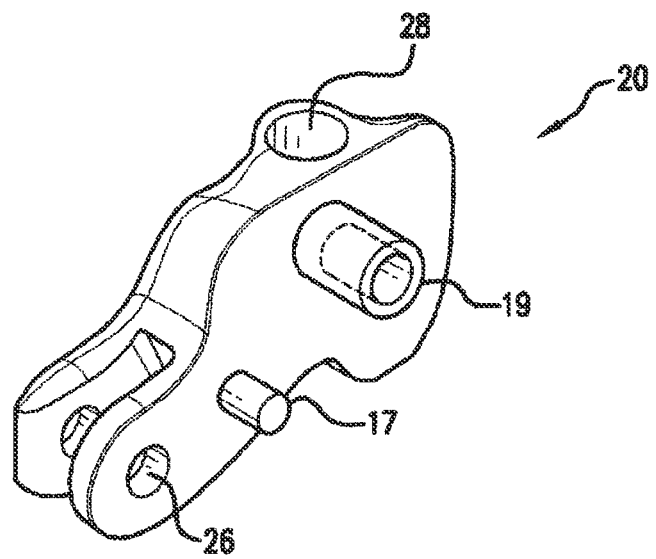
Figure 14E:
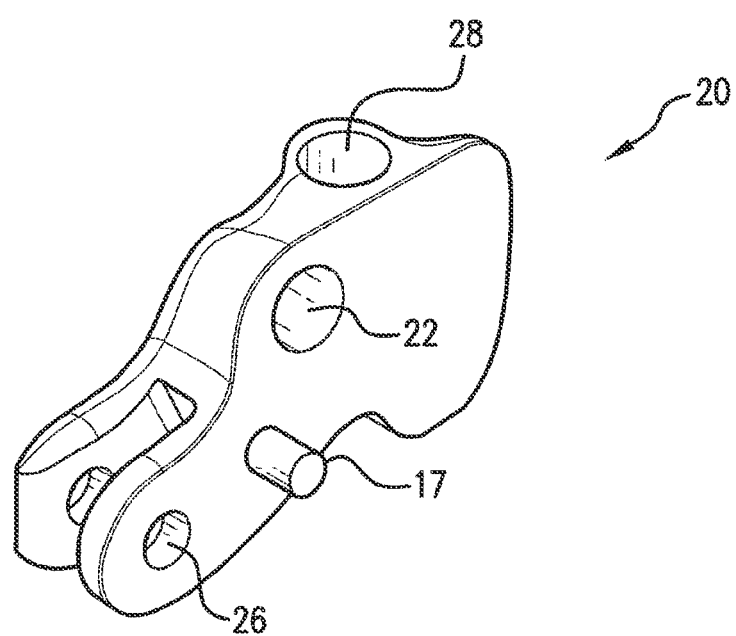

As shown in FIG. 14C, according to one embodiment, the body can define a plurality of mounting bosses 19. FIG. 14D illustrates an embodiment of the body 20 wherein the body comprises a mounting boss 19 and a locating pin 17. The locating pin, in one aspect, can be an elongate protrusion that extends from the rear surface 23 of the body. In another aspect, the locating pin can have a predetermined outer diameter configured to engage a locating pin bore defined therein the mounting surface. FIG. 14E illustrates yet another embodiment of the body 20, wherein the body defines a mounting bore 22 and comprises a locating pin 17.

Figure 6:
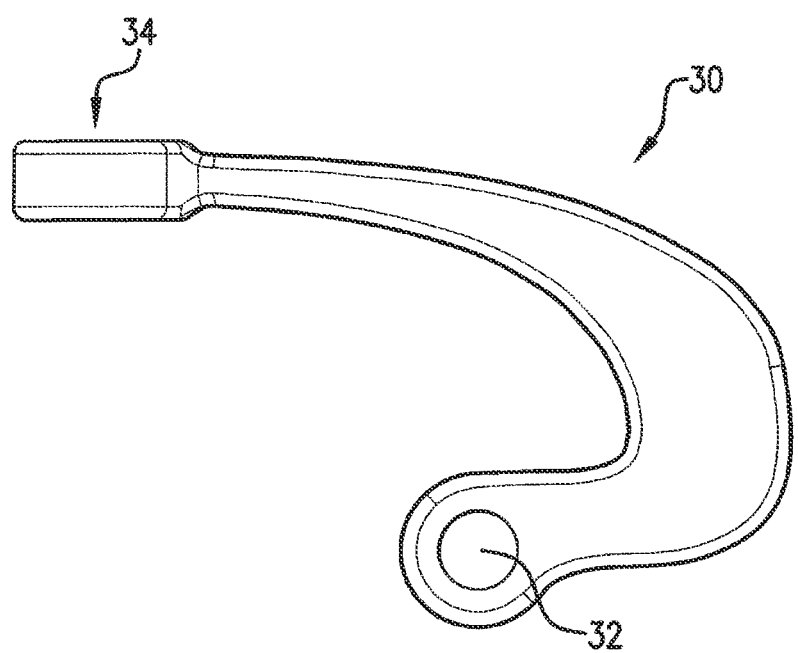
FIG. 6 is a front elevational view of the hasp of the shackle of FIG. 1.
Figure 7:
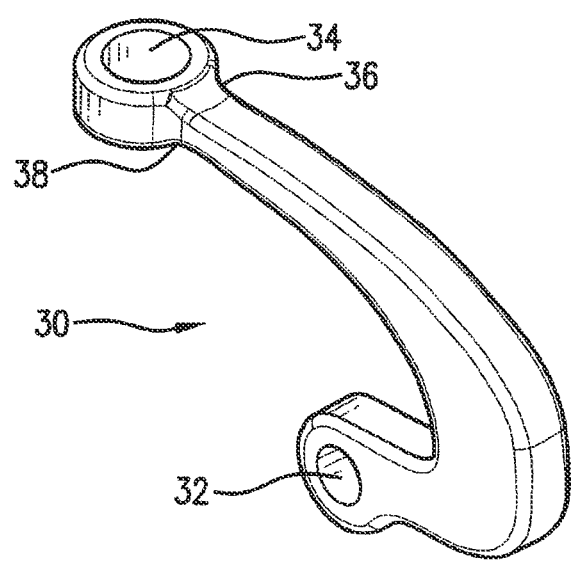
FIG. 7 is a perspective view of the hasp of the shackle of FIG. 6.

In another aspect, the hasp 30 of the shackle 10 is illustrated in FIGS. 6 and 7. The hasp can be an arcuate member having a proximal and a distal end. In one aspect, the distal end of the hasp 30 can define a hasp locking pin bore 34 that is configured to receive the locking pin 40. In another aspect, the hasp locking pin bore can be substantially circular having a predetermined radius and a longitudinal axis. In a further aspect, the proximal end of the hasp defines the hasp rotation pin bore 32 that is configured to receive the rotation pin 60 so that, when assembled as described below, the hasp can be rotated relative to the body 20 of the shackle 10. In yet another aspect, the hasp rotation pin bore can be substantially circular having a predetermined radius and a longitudinal axis. In another aspect, the longitudinal axis of the hasp rotation pin bore can be substantially perpendicular to the longitudinal axis of the hasp locking pin bore. In a further aspect, the outer edges of the distal end of the hasp 30 can be tapered towards the center of the hasp so that shoulders 36, 38 are formed adjacent the hasp locking pin bore.

Figure 8:
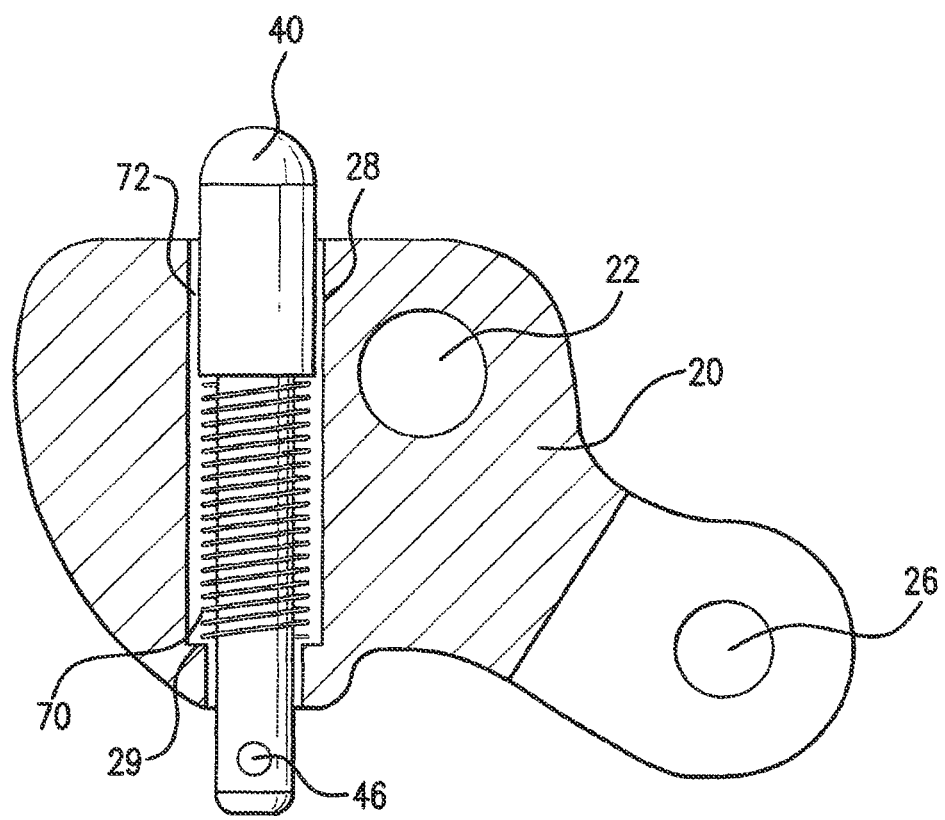
FIG. 8 is a cross-sectional view of portions of the shackle of FIG. 1 in an assembled condition.

The bias element 70 is illustrated in FIG. 8, according to one aspect. The bias element can have a proximal end and a distal end and can be sized to fit therein the spring chamber 72 of the body 20. In one aspect, a portion of the proximal end of the bias element can be configured to seat against or otherwise engage a portion of the shoulder 29 of the body locking pin bore 28. In another aspect, a portion of a distal end of the bias element 70 can be configured to engage at least a portion of the shoulder 44 of the locking pin 40. In still another aspect, the bias element can be movable between a first state, in which external force is not applied to the bias element, and a second state, in which external force is applied to the bias element. When installed and assembled as a component of the quick detach shackle 10, in the first state, in one aspect, the bias element 70 can urge at least a portion of the proximal end of the locking pin 40 to extend from the body 20. In the second state, in another aspect, at least a portion of the proximal end of the locking pin can be contained therein the body locking pin bore 28.

In one exemplary aspect, with reference to FIG. 1, the quick detach shackle 10 of the present application can be assembled by inserting the hasp 30 into the slot 24 of the body 20 such that the hasp rotation pin bore 32 is co-axially aligned with the body rotation pin bore 26. A rotation element, such as for example and without limitation, a rotation pin 60, can be inserted therethrough the co-axially aligned bores to create a hinge about which the hasp can rotate relative to the body of the shackle.

In another aspect, a locking pin 40 can be mounted therein the body 20 of the shackle 10. In one aspect, a bias element 70, such as, for example and without limitation, a spring can be positioned within the spring chamber 72 defined by the body locking pin bore 28 such that the proximal end of the spring is seated on or otherwise engages the shoulder 29 formed within the body locking pin bore. In one aspect, as illustrated in FIG. 8, the distal end of the locking pin 40 can be inserted through the body locking pin bore, and simultaneously through the bias element, until the shoulder 44 of the locking pin engages and/or compresses the distal end of the bias element 70. In another aspect, a pull ring 50 or a releasing lever 51 can then be inserted through the pull ring bore 46 of the distal end of the locking pin 40, thereby preventing the locking pin from being removed from the body 20.

In a further aspect, the distal end of the locking pin can be threaded and, after insertion of the locking pin through the body locking pin bore, a locking collar can be threaded onto the locking pin to prevent the locking pin 40 from being removed from the body. In still another aspect, the distal end of the locking pin can be flared so that the diameter of the distal end of the locking pin 40 is greater than the diameter of the portion of the body locking pin bore that is adjacent the lower edge surface 27 of the body locking pin bore 28, so that after insertion of the locking pin through the body locking pin bore, the locking pin can be prevented from being removed from the body 20.

In operation, the hasp 30 can be closed, such that a portion of the proximal end of the locking pin 40 can be positioned in selective frictional engagement with the hasp locking pin bore 34, which prevents the hasp 30 from inadvertently opening. To open the hasp, in one aspect, the locking pin 40 can be moved to the second state by exerting force against the bias element. This can allow the hasp to open independent of gravity, which can be helpful if the shackle 10 is in an unusual orientation, such as upside down.

Thus, when assembled in this manner, the hasp 30 can selectively rotate about the longitudinal axis of the hasp rotation pin bore 32 about and between an open and a closed position. In the closed position, in one aspect, portions of the body 20 and the hasp define an enclosed area when the distal end of the hasp is positioned adjacent to or in contact with a portion of the body of the shackle 10 and at least a portion of a proximal end of the locking pin 40 extends from the body and through at least a portion of the hasp locking pin bore. In the open position, in another aspect, the body 20 and the hasp form an unenclosed area, such that the distal end of the hasp 30 is not maintained in a position adjacent to or in contact with portions of the body.

Figure 9:
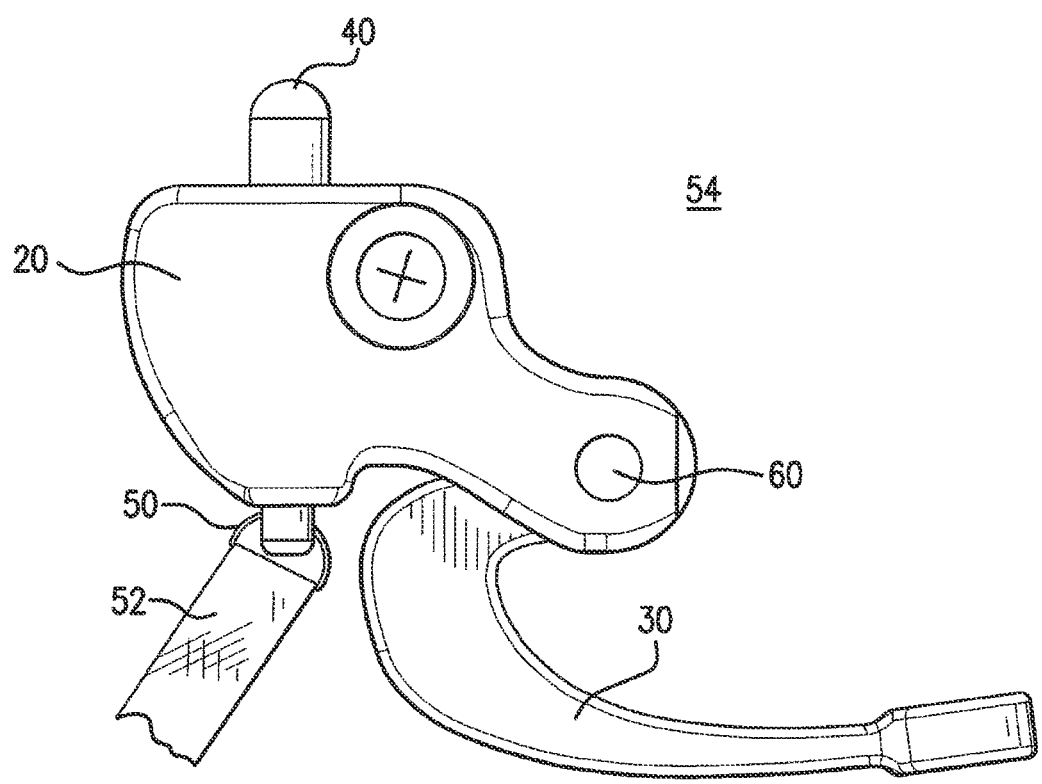
FIG. 9 is an elevational view of a quick detach shackle in an open position, according to one aspect.
Figure 10:
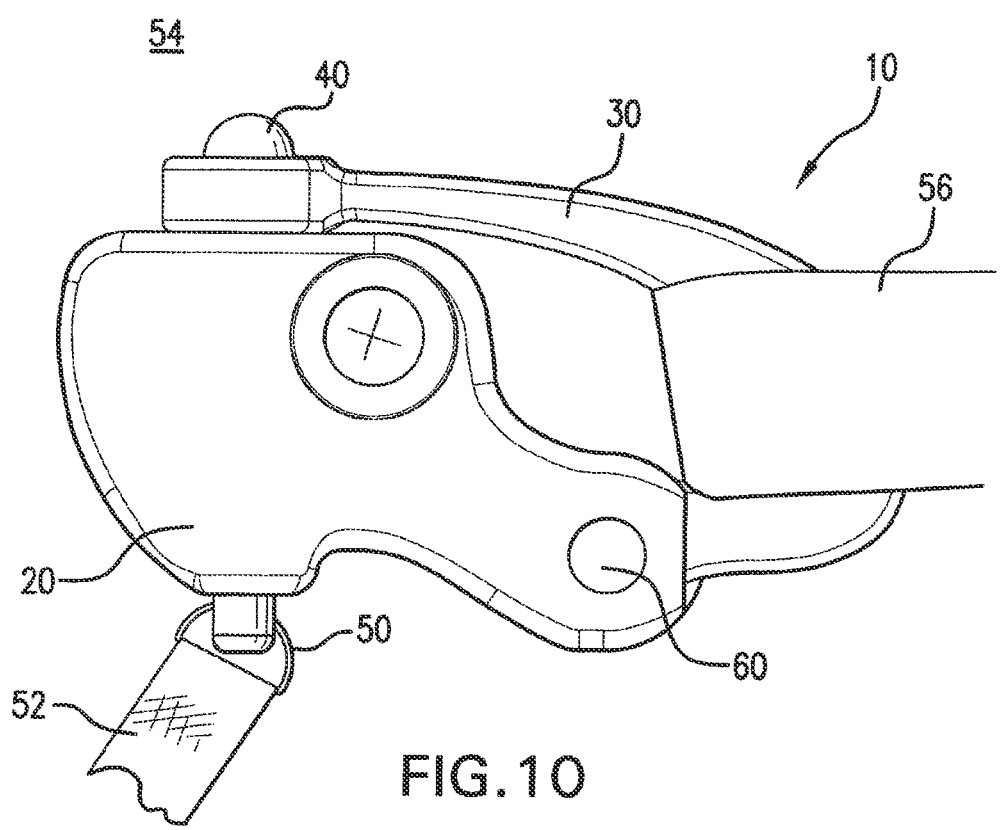
FIG. 10 is an elevational view of the shackle of FIG. 9 in a closed position.

It is contemplated that the quick detach shackle 10 can be mounted on a surface 54, as illustrated in FIGS. 9 and 10. In one aspect, the shackle can be mounted onto an exterior surface of a helmet. It is contemplated, however, that the quick detach shackle can be mounted on any surface. It is further contemplated that the shackle can be mounted on a surface with conventional means, such as, for example and without limitation, with mechanical fasteners such as bolts, rivets, clamps, pressed stubs with nuts, and the like. In one aspect, the mechanical fasteners can be passed through the at least one mounting bore 22 on the body 20 of the shackle and into a complementary bore on the mounting surface 54 to which the shackle is to be mounted. In another aspect, the mechanical fasteners can be passed through a bore on the surface to which the shackle is to be mounted and into the internal diameter of the at least one mounting boss 19. In still another aspect, the mounting boss can be inserted through a bore on the surface 54 to which the shackle is to be mounted and a mechanical fastener, such as a nut and the like, can be attached to the threaded external diameter of the mounting boss.

In one embodiment, the mounted shackle can be oriented with respect to the front of the helmet such that the locking pin 40 is oriented substantially vertically when the helmet is placed on the head of a user. In this aspect, a portion of the distal end of the locking pin would extend outwardly from the lower edge surface 27 of the shackle, and the opening that is selectively enclosed by the hasp 30 to form the enclosed area would face rearwardly away from the front of the helmet. In this aspect, the hasp of the shackle 10 can be positioned generally nearest to a tethering device 56 to be attached to the shackle. When aligned according to this aspect, the center of gravity of the hasp can beneficially be located rearward of the rotation pin 60 when the hasp 30 opens rearwardly relative to the front of the helmet. This exemplary alignment can create a naturally opening moment of the hasp about the hinge. In one aspect, the rear surface 23 of the body 20 can be positioned adjacent to or in contact with the mounting surface 54. However, it is contemplated that the shackle 10 could be formed such that the front surface 21 of the shackle could also be positioned adjacent to or in contact with the mounting surface when mounted. In one aspect, when aligned as described herein, force from the tethering device 56 applied to the hasp 30 can open the hasp, and thereby release the tethering device 56. In another aspect, the locating pin 17 can be configured to engage a corresponding bore defined therein the mounting surface 54 to assist a user in orienting the shackle on the mounting surface.

In operation, the quick detach shackle 10 can be mounted to a mounting surface 54 such as, for example, the helmet surface illustrated in FIG. 9. In one aspect, the security of the mounting to allow for, for example and without limitation, different mounting surface curvatures or surface imperfections, can be enhanced by including a compliant gasket between the body 20 and the mounting surface 54. In another aspect, the compliant gasket can comprise, for example, and without limitation an o-ring type seal positioned concentrically around the mounting.

In one aspect, upon mounting the quick detach shackle to the helmet surface, a user can apply a pulling force to the pull ring 50 or the releasing lever 51, which results in an axial translation of the locking pin 40 within the body locking pin bore 28 and compression of the bias element 70. The axial translation of the locking pin retracts the proximal end of the locking pin 40 in a direction from the upper edge surface 25 towards the lower edge surface 27 of the body.

In various aspects, it is contemplated that the pull ring 50 can be directly pulled by the user, or that a releasing device 52 such as a strap, wire, rope, webbing, chain and the like can be attached to the pull ring, as illustrated in FIG. 9, thereby allowing the user to pull the releasing device, which transmits a pulling force to the pull ring or to the distal end of the locking pin 40. In one aspect, the size of the pull ring 50 can be increased for direct user pulling, or decreased for indirect pulling through a releasing device. In this embodiment, with the locking pin retracted (i.e., translated in a direction from the upper edge surface 25 of the body 20 towards the lower edge surface 27), the hasp 30 can be rotated around the rotation pin 60 from the open position to the closed position.

Figure 11:
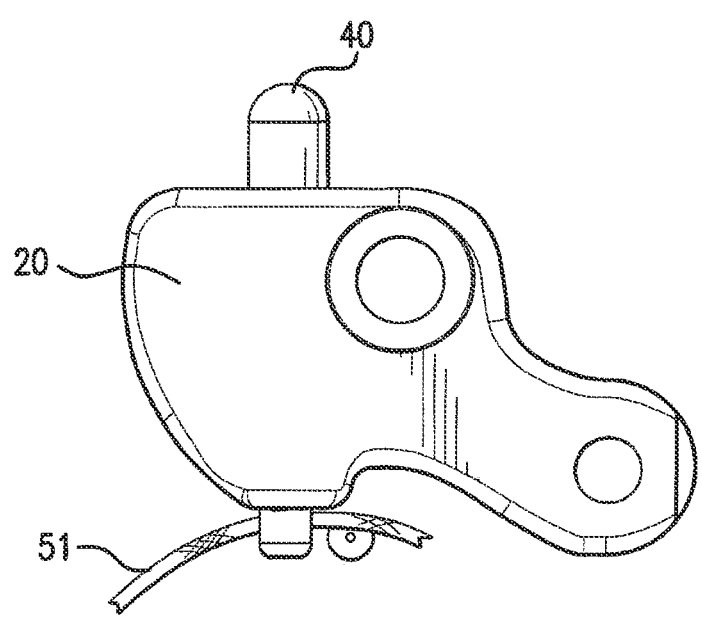
FIG. 11 is a front elevational view of an embodiment of a quick detach shackle having a releasing lever.

In another aspect, as illustrated in FIG. 11, it is contemplated that a releasing lever 51 can be inserted into the pull ring bore 46 of the locking pin 40 instead of a pull ring 50. In this aspect, when an end portion of the releasing lever 51 is pressed towards the body 20 of the shackle 10 by the user, a pulling force is transmitted to the distal end of the locking pin, which retracts the locking pin. In this embodiment, and as one skilled in the art will appreciate, with the locking pin 40 retracted, the hasp 30 can be rotated around the rotation pin from the open position to the closed position.

A tethering device 56 that the user wishes to be secured can be looped around the hasp 30 while in the open position. It is contemplated that the tethering device can comprise a strap, wire, rope, webbing, chain and the like. It is further contemplated that the tethering device can define an opening, such as, for example and without limitation, a sewn loop in a strap, an interior portion of a link of chain, a spliced loop in a wire or rope, and the like. Upon placing the opening of the tethering device 56 around the hasp, the hasp can be rotated to the closed position by rotating the hasp 30 into the slot 24 of the body 20 such that the hasp locking pin bore 34 is co-axially aligned with the retracted locking pin. The locking pin 40 can then be released so that the bias element 70 urges the locking pin to move in a direction from the lower edge surface 27 of the body towards the upper edge surface 25 and axially therein the body locking pin bore 28 so that the proximal end of the locking pin 40 is seated in selective frictional engagement with the hasp locking pin bore 34, illustrated in FIG. 10. As described above, the closing of the hasp creates the enclosed area and selectively secures the tethering device relative to the mounting surface.

In one aspect, the locking pin 40 can be depressed by the distal end of the hasp 30 during the process of closing the hasp, such that the bias element 70 urges the locking pin to move in a direction from the lower edge surface 27 of the body towards the upper edge surface, and axially therein the body locking pin bore when the hasp locking pin bore 34 is substantially co-axially aligned with the retracted locking pin, so that the proximal end of the locking pin 40 is seated in selective frictional engagement with the hasp locking pin bore. Thus, in this aspect, it is not necessary for the user to retract the locking pin before closing the hasp 30. The closing of the hasp creates the enclosed area and selectively secures the tethering device 56 relative to mounting surface 54.

Once the tethering device 56 has been enclosed in a hasp 30 that has been closed and secured by the locking pin, the tethering device can be released from the quick release shackle 10 by pulling on the pull ring 50. In one aspect, the user can pull the releasing device 52, so that the releasing device transmits this force to the pull ring. Pulling the pull ring compresses the bias element 70 and retracts the locking pin. The hasp 30 can then be rotated relative to the body 20 to open the enclosed area such that the tethering device can be selectively removed from the shackle. In another aspect, due to the location of the center of gravity of the hasp 30 and/or the shape of the distal end portion of the hasp, force applied by the tethering device 56 on the hasp can be sufficient to open the hasp and separate the tethering device from the shackle 10 when the locking pin 40 has been retracted. It is contemplated that the distal end portion of the hasp 30 can be shaped such that the distal end of the hasp does not "hook" an opening or the like of the tethering device 56 under application of an applied tether load.

In yet another aspect, the at least one mounting bore 22 of the body 20 can be positioned between the body locking pin bore 28 and the body rotation pin bore 26, as illustrated in FIG. 4. With the at least one mounting bore in this location, the overall size of the assembled quick detach shackle 10 can be beneficially reduced. Further, with the at least one mounting bore in this location, the torque acting on an assembled, quick detach shackle that has been fixedly attached to the mounting surface 54 can be operatively reduced, because the distance from the rotation pin 60 (which transmits forces received from the tethering device to the body 20) to the at least one mounting bore 22 is reduced. Reduced torque on the shackle 10 beneficially allows the shackle to remain affixed to the mounting surface 54 in the proper orientation more readily than would occur with increased torque.

Alternatively, it is contemplated that, should the body 20 be loosely mounted to the mounting surface, either deliberately by design or through error, torque applied to the bolt, screw, or other similar fastener when the shackle is in use can act to ensure that the load on the hasp 30 can beneficially be transferred to the more secure proximal end portion of the hasp adjacent the rotation pin 60.

Proper orientation of the quick detach shackle 10 on the mounting surface 54 can allow, in one aspect, a user to simply pull the pull ring 50 or press the releasing lever 51 to release the locking pin 40. With the shackle in the mounting orientation, as noted above, the force applied therethrough the tethering device 56 to the hasp 30 can be sufficient to open the hasp and free the tethering device. In one exemplary aspect, if the shackle is allowed to rotate on the mounting surface such that the shackle 10 is not aligned as described above, the force of the tethering device on the hasp may not be sufficient to open the hasp 30, which can prevent the user from quickly detaching the tethering device 56 from the shackle.

In further aspects, it is contemplated that the body locking pin bore 28 of the body 20 can be located between the body rotation pin bore 26 and the at least one mounting bore 22. This increases the size of the enclosed area, allowing a larger tethering device to be attached to the hasp 30.

It is contemplated, as can be appreciated by one skilled in the art, that the components of the quick detach shackle 10 can be formed from metals, such as, for example and without limitation, steel, aluminum, titanium and the like. It is further contemplated that the components of the shackle can be formed from polymeric materials, such as, for example and without limitation, nylon. It is further still contemplated that the shackle can be formed from a combination of metallic, polymeric, and/or other components.

Figure 12:
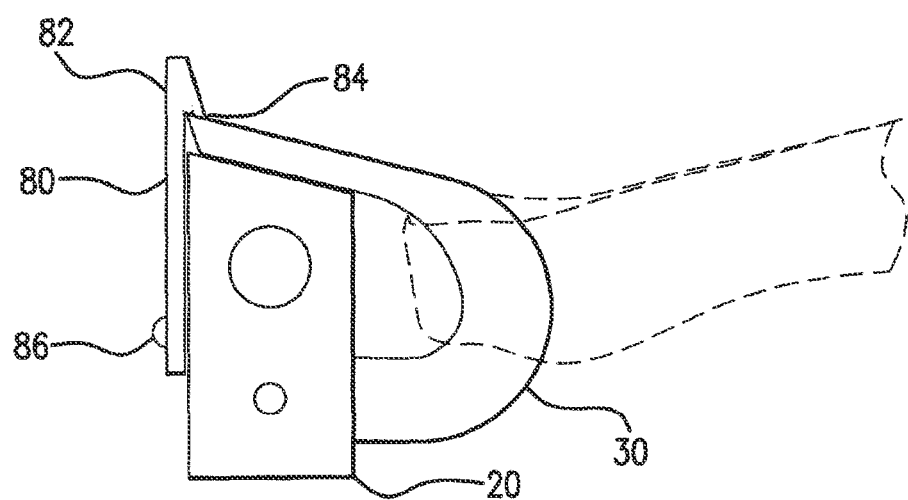
FIG. 12 is a front elevational view of an embodiment of the quick detach shackle, having a locking pawl.

In another embodiment of the quick detach shackle 10, as illustrated in FIG. 12, the locking pin 40 can be replaced with a locking pawl 80. In one aspect, the locking pawl can be an elongate bar having a proximal end and an opposed distal end.

In one aspect, the proximal end of the locking pawl forms a locking pawl head 82, which can have a width that is larger than the width of the distal end of the locking pawl. A locking pawl shoulder 84 can be formed on the locking pawl at the junction of the larger width of the proximal end and the smaller width of the distal end. Further, the distal end portion can define a mounting bore 86 that is configured to attach the locking pawl to the body 20.

In this embodiment, in operation, the hasp 30 can be closed, such that the shoulder 84 of the locking pawl 80 can be positioned in selective frictional engagement with the distal end of the hasp 30, which prevents the hasp from inadvertently opening. The hasp can selectively be released from the locking pawl by bending the locking pawl away from the hasp until the shoulder of the locking pawl does not engage the distal end of the hasp.

In another embodiment, as shown in FIGS. 15A-D, the quick detach shackle 100 comprises a body 120, a hasp 130, and a locking pin 40. The body has a proximal end and a distal end, a front surface 121 and an opposing rear surface 123, an upper edge surface 125 and an opposing lower edge surface 127, and a first side edge surface 113 and an opposing second side edge surface 115. In one aspect, the distal end of the body 120 can have a distance from the upper edge surface 125 to the lower edge surface 127 that is less than the corresponding distance on the proximal end of the body.

In one aspect, the body can define at least one mounting bore 122 that is configured for attaching the shackle to a mounting surface, such as, for example and without limitation, a helmet surface. The at least one mounting bore 122 can be a substantially circular bore of a predetermined radius that extends from the front surface of the body to the rear surface having a longitudinal axis. In another aspect, the at least one mounting bore can extend from the front surface 121 of the body to the rear surface 123 substantially transverse to the body locking pin bore 128. In another aspect, the at least one mounting bore can be positioned between a body locking pin bore and the hasp, when the hasp is in a closed position, described more fully below. It is of course contemplated that the body 120 can comprise at least one of the at least one mounting bore 122, at least one mounting boss 19 and at least one locating pin 17.

In another aspect, the body 120 of the shackle can define the body locking pin bore 128 having a predetermined radius and a longitudinal axis. In one aspect, the body locking pin bore can define an opening in the upper edge surface 125 of the body. In another aspect, the body locking pin bore can extend from the upper edge surface of the body to the lower edge surface 127 of the body. In still another aspect, the body locking pin bore can be substantially circular. In one aspect, a portion of the body locking pin bore 128 that is adjacent the upper edge surface of the body can have a predetermined radius that is greater that a portion of the body locking pin bore that is adjacent the lower edge surface, such that a shoulder 129 is formed therebetween. In one aspect, at least a portion of the body locking pin bore that is defined by the larger radius can define a spring chamber 172 that is configured for receiving the bias element 70 therein. As will be more fully described below, the shoulder creates a ledge for the bias element to seat against or engage.

In another aspect, a recess 126 having a first wall 1261 and a second wall 1262 can be defined in the body 120, as illustrated in FIG. 15B. In one aspect, the recess can extend from an opening defined in the lower edge surface 127 generally towards the upper edge surface 125. In another aspect, the first wall 1261 can have a greater length than the second wall 1262.

In another aspect, the first wall 1261 can be positioned in a plane substantially parallel to the longitudinal axis of the body locking pin bore 128. In another aspect, the first wall can be positioned in a plane at an acute angle relative to a plane of the second wall 1262. It is contemplated, however, that the first wall 1261 can be positioned in a plane at an acute angle to the longitudinal axis of the body locking pin bore 128. In another aspect, a corner edge 1263 can be formed between the lower edge surface 127 of the body and the second wall of the recess 126. In still another aspect, at least a portion of the recess of the body can be configured to receive at least a portion of a shoulder member 132 of the hasp 130, described more fully below. For example, the corner edge 1263 of the recess 126 can frictionally engage the shoulder member of the hasp, which when assembled as described below, can prevent the hasp 130 from detaching from the body 120.

In another aspect, the hasp 130 of the shackle 100 can be a member having a proximal and a distal end. In one aspect, the distal end of the hasp can define a hasp locking pin bore 134 that is configured to receive the locking pin 40. In another aspect, the hasp locking pin bore 134 can be substantially circular having a predetermined radius and a longitudinal axis. In another aspect, the outer edges of the distal end of the hasp 30 can be tapered towards the center of the hasp so that there is a smooth transition between the width of the distal end of the hasp 130 and the center portion of the hasp.

In one aspect, the proximal end of the hasp can be formed into a shoulder member 132 configured to be received in the recess 126 of the body 120 so that, when assembled as described below, the hasp can be selectively, securedly attached to the body. In another aspect, and as illustrated in FIG. 15A, the shoulder member 132 can be positioned in a plane that is substantially parallel to the longitudinal axis of the hasp locking pin bore 134. In another aspect, the shoulder member 132 can be positioned in a plane that is at an acute angle relative to the longitudinal axis of the hasp locking pin bore 134. In still another aspect, the recess can be positioned in a plane bisecting the at least one mounting bore 122

In another aspect, a central portion of the hasp 130 can define a cavity 136 between an outer hasp wall 1361 and an inner hasp wall 1362. In this aspect, the central portion of the hasp can be configured to receive a tethering device 56 such as a strap, wire, rope, webbing, chain and the like. In one aspect, the tethering device can define an opening, such as, for example and without limitation, a sewn loop in a strap, an interior portion of a link of chain, a spliced loop in a wire or rope, and the like. In another aspect, the opening of the tethering device 56 can enclose at least a portion of the outer hasp wall 1361 of the central portion of the hasp 130 so that the tethering device is permanently, securedly attached to the hasp.

In this aspect, wherein the tethering device 56 can be permanently, securedly attached to the hasp 130, the elongate, arcuate shape of the hasp of conventional shackles can be eliminated, thereby allowing shackle designs which create a relatively short lever arm from which, relatively small moments are imparted around the at least one mounting bore 122 under loads. In another aspect, the permanently attached tethering device can allow a user to have a greater degree of freedom in the orientation of the pull release direction such that the pull release can be angled in the direction of the release movement, resulting in an easier and more natural function. In still another aspect, permanently attaching the tethering device 56 can allow a single-sized hasp 130 to accommodate differing tethering device types, sizes, etc, without concern about the tethering device hanging-up on the hasp.

In one exemplary aspect, the quick detach shackle 100 can be assembled by mounting the locking pin 40 therein the body 120 of the shackle 100. In one aspect, the bias element 70, such as, for example and without limitation, a spring can be positioned within the spring chamber 172 defined by the body locking pin bore 128 such that the proximal end of the spring is seated on or otherwise engages the shoulder 129 formed within the body locking pin bore. In one aspect, the distal end of the locking pin 40 can be inserted through the body locking pin bore, and simultaneously through the bias element, until the shoulder 44 of the locking pin engages and/or compresses the distal end of the bias element 70. In another aspect, a pull ring 50 or a releasing lever 51 can then be inserted through the pull ring bore 46 of the distal end of the locking pin 40, thereby preventing the locking pin from being removed from the body 20.

In operation, in one aspect, the hasp 130 can be closed by inserting the shoulder member 132 of the hasp into the recess 126 of the body 120. Because, according to one aspect, the recess can have a larger volume than the shoulder member, the shoulder member can move translationally at least slightly therein the recess. In another aspect, because the first wall 1261 of the recess 126 can be at an acute angle relative to the second wall 1262, the shoulder member can rotate at least slightly therein the recess. In another aspect, the shoulder member 132 can be positioned and rotated therein the recess such that a portion of the proximal end of the locking pin 40 can be positioned in selective frictional engagement with the hasp locking pin bore 134, which secures the hasp to the body and prevents the hasp 130 from inadvertently opening. Thus, in a closed position, at least a portion of a proximal end of the locking pin 40 extends from the body 120 and through at least a portion of the hasp locking pin bore 134, and at least a portion of the shoulder member 132 of the hasp extends into the recess 126 of the body.

Because the tethering device 56 can be permanently attached to the hasp, only one motion is required to secure the tethering device to the shackle 100, i.e., closing the hasp 130. Additionally, having the tethering device permanently attached to the hasp can eliminate the risk that the tethering device can hang-up on the hasp when trying to disengage the tethering device from the shackle 100.

Thus, when assembled in this manner, the tethering device 56 securely attached to the hasp 130 is also securely attached to the body 120 of the shackle 100. Once the hasp 130 has been securely attached to the body by the locking pin 40, the tethering device can be released from the quick detach shackle 100 by compressing the bias element 70 and retracting the locking pin 40 by, for example and without limitation, pulling on the pull ring 50. In one aspect, the user can pull the releasing device 52, so that the releasing device transmits this force to the pull ring. The hasp 130 can then be rotated relative to the body 120 so that the shoulder member 132 of the hasp can be disengaged from the recess of the body, thereby releasing the tethering device from the shackle 100. In another aspect, due to the location of the center of gravity of the hasp 130 and/or the shape of the distal end portion of the hasp, force applied by the tethering device 56 on the hasp can be sufficient to open the hasp and separate the tethering device from the shackle 100 when the locking pin 40 has been retracted.

In another embodiment, as illustrated in FIGS. 16F and 17A, the recess 126 of the body 120 can be generally arcuate in shape and can extend from an opening defined in the second edge surface 115 of the body generally towards the first edge surface 113 and/or the lower edge surface 127. In this aspect, the recess 126 can have a predetermined inner radius and outer radius. In still another aspect, as illustrated in FIG. 16F, at least a portion of the arcuate recess can be positioned around at least a portion of the at least one mounting bore 122 of the body 120 to beneficially reduce the size of the shackle 100.

In another aspect, and as illustrated in FIGS. 16A, 17A, and 18A, the shoulder member 132 of the hasp 130 can be generally arcuate in shape having a predetermined inner radius and an outer radius. In still another aspect, the predetermined inner and outer radii of the arcuate shoulder member 132 can be sized to matingly engage at least a portion of the arcuate recess 126 of the body.

In operation, in one aspect, the hasp 130 can be closed by inserting the arcuate shoulder member 132 of the hasp into the arcuate recess 126 of the body 120. Because, according to one aspect, the recess can have a larger volume than the shoulder member, the shoulder member can move translationally at least slightly therein the recess. In another aspect, because the shoulder member 132 and the recess 126 are arcuate, the shoulder member can rotate at least slightly therein the recess. In another aspect, the shoulder member 132 can be positioned and rotated therein the recess such that a portion of the proximal end of the locking pin 40 can be positioned in selective frictional engagement with the hasp locking pin bore 134, which secures the hasp to the body and prevents the hasp 130 from inadvertently opening. FIGS. 16B-16F, 17B-17E, and 18B-18F illustrate various embodiments of the shackle 100 having a hasp 130 with an arcuate shoulder member 132 in the closed position.

In still another embodiment, as illustrated in FIG. 18A, the body can further comprise at least rotating pin 111. In one aspect, the rotating pin can extend from the front surface 121 of the body 120 to the rear surface of the body through the recess 126. In this aspect, the rotating pin can have a predetermined outer diameter configured to matingly engage the arcuate shoulder member 132. In operation, in one aspect, the hasp 130 can be closed by inserting the arcuate shoulder member 132 of the hasp into the recess 126 and around the outer diameter of the rotating pin 111. Because, according to one aspect, the recess can have a larger volume than the shoulder member, the shoulder member can move translationally at least slightly therein the recess. In another aspect, because an inner diameter of the shoulder member 132 and the outer diameter of the rotating pin 111 can be substantially the same, the shoulder member can rotate at about the rotating pin. In another aspect, the shoulder member 132 can be positioned and rotated therein the recess such that a portion of the proximal end of the locking pin 40 can be positioned in selective frictional engagement with the hasp locking pin bore 134, which secures the hasp to the body and prevents the hasp 130 from inadvertently opening.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is therefore understood that the invention is not limited to the specific embodiments disclosed herein, and that many modifications and other embodiments of the invention are intended to be included within the scope of the invention. Moreover, although specific terms are employed herein, they are used only in a generic and descriptive sense, and not for the purposes of limiting the described invention.

What is claimed is:

1. A shackle for a helmet having a mounting surface comprising:

a body having a front surface, an opposing rear surface, a upper edge surface, an opposing lower edge surface, wherein the body defines a body locking pin bore extending from the upper edge surface to the lower edge surface, wherein the body defines at least one mounting bore extending from the front surface to the rear surface substantially transverse to the body locking pin bore, and wherein the body defines a recess extending from the lower edge surface towards the upper edge surface;

a locking pin configured for selective axial movement therein the body locking pin bore; and a hasp having a distal end defining a hasp locking pin bore and comprising a shoulder member positioned at a proximal end of the hasp, wherein in a closed position, at least a portion of a proximal end of the locking pin extends from the body and through at least a portion of the hasp locking pin bore and at least a portion of the shoulder member of the hasp extends into the recess of the body, and wherein in an open position, the hasp is separable from the body, wherein the at least one mounting bore is positioned therebetween the body locking pin bore and the hasp when the hasp is in the closed position.

2. The shackle of claim 1, wherein the hasp has a central portion defining a cavity between an outer hasp wall and an inner hasp wall and further comprising a tethering device securely attached to the cavity of the hasp.

3. The shackle of claim 2, wherein an opening of the tethering device can enclose at least a portion of the outer hasp wall.

4. The shackle of claim 1, wherein a distal end of the locking pin defines a bore configured to receive a pull ring.

5. The shackle of claim 1, wherein a distal end of the locking pin defines a bore configured to receive a releasing lever.

6. The shackle of claim 1, further comprising a bias element having a proximal end, and a distal end, wherein a portion of a proximal end of the bias element engage a portion of the body locking pin bore, and wherein a portion of a distal end of the bias element engages a portion of the locking pin.

7. The shackle of claim 6, wherein in a first state, in which external force is not applied to the bias element, the bias element urges at least a portion of the proximal end of the locking pin to extend from the body.

8. The shackle of claim 7, wherein in a second state, in which external force is applied to the bias element, at least a portion of the proximal end of the locking pin is contained therein the body locking pin bore.

9. The shackle of claim 1, wherein the mounting surface is an exterior surface of a protective helmet.

10. The shackle of claim 1, wherein the recess of the body comprises a plurality of walls.

11. The shackle of claim 10, wherein at least one wall of the plurality of walls is positioned in a plane substantially parallel to an axis of the body locking pin bore.

12. The shackle of claim 11, wherein at least one wall of the plurality of walls is positioned in a plane at an acute angle to the axis of the body locking pin bore.

13. The shackle of claim 1, wherein the recess is positioned in a plane bisecting the at least one mounting bore.

14. The shackle of claim 1, wherein at least a portion of the recess is arcuate and wherein at least a portion of the shoulder member is arcuate.

15. The shackle of claim 14, wherein at least a portion of the arcuate recess is positioned around at least a portion of the at least one mounting bore.

16. The shackle of claim 1, wherein the shoulder member is positioned in a plane substantially parallel to a longitudinal axis of the hasp locking pin bore.

17. The shackle of claim 1, wherein the shoulder member is positioned in a plane at an acute angle relative to the longitudinal axis of the hasp locking pin bore.

\* \* \* \* \*